(12) United States Patent
Park (10) Patent No.: US 6,725,046 B2
(45) Date of Patent: Apr. 20, 2004

(54) FREQUENCY LIST IMPLEMENTED USING A PLURALITY OF BASIC FREQUENCIES AND BIT MAPS FOR USE IN A GSM SYSTEM

(75) Inventor: Hong-Ju Park, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 476 days.

(21) Appl. No.: 09/752,597

(22) Filed: Dec. 28, 2000

(65) Prior Publication Data

US 2001/0006894 A1 Jul. 5, 2001

(30) Foreign Application Priority Data

Dec. 31, 1999 (KR) .......................... 1999-68287

(51) Int. Cl.[7] .............................................. H04Q 7/20
(52) U.S. Cl. ................ 455/450; 455/452.1; 455/452.2; 455/446
(58) Field of Search .......................... 455/452.1, 452.2, 455/446, 62, 422.1, 450; 370/337, 392

(56) References Cited

U.S. PATENT DOCUMENTS 5,526,349 A * 6/1996 Diaz et al. ................... 370/392
5,966,657 A * 10/1999 Sporre ......................... 455/425
6,295,286 B1 * 9/2001 Rajala ......................... 370/337

OTHER PUBLICATIONS

European Search Report dated Jul. 15, 2002 issued in a counterpart application, namely 00128359.7–2411.
ETSI: "Digital Cellular Telecommunications System (Phase 2+); Mobile Radio Interface; Layer 3 Specification; (GSM 04.08 Version 5.11.1 Release 1996)", Mar. 1999.

* cited by examiner

Primary Examiner—William Trost
Assistant Examiner—Sharad Rampuria
(74) Attorney, Agent, or Firm—Dilworth & Barrese LLP (57) ABSTRACT

A frequency format for use in a GSM (Global System for Mobile telecommunication) system. The frequency format comprises first information for defining a frequency list, said first information being arranged in a first octet; second information for defining a length of the frequency list, said second information being arranged in a second octet; first and second format IDs (identifications) being arranged in a specific part of a third octet; a plurality of basic frequencies arranged in a remaining part of the third octet to the last octet; and a plurality of bit maps each arranged between the basic frequencies. The number of the basic frequencies is varied depending on the length of the frequency list and the number of the bit maps between the basic frequencies.

5 Claims, 8 Drawing Sheets

| FORMAT EXPRESSION | FREQ No | FREQ RANGE | REMARKS |
|---|---|---|---|
| ARRANGED BY 10 BITS | 12 | UNLIMITED | START FREQ UNLIMITED |
| BIT MAP #0 | 124 | 124 | START FREQ UNLIMITED |
| 1024 RANGE | 17 | UNLIMITED | START FREQ UNLIMITED |
| 512 RANGE | 18 | 512 | START FREQ UNLIMITED |
| 256 RANGE | 22 | 256 | START FREQ UNLIMITED |
| 128 RANGE | 29 | 128 | START FREQ UNLIMITED |
| VARIABLE BIT MAP | 112 | 112 | START FREQ UNLIMITED |

FIG. 1

| FORMAT ID #1 | | FORMAT ID #2 | | | FORMAT EXPRESSION |
|---|---|---|---|---|---|
| BIT 8 | BIT 7 | BIT 4 | BIT 3 | BIT 2 | |
| 0 | 0 | FREQ INFO | | | BIT MAP #0 |
| 1 | 0 | 0 | FREQ INFO | | 1024 RANGE |
| 1 | 0 | 1 | 0 | 0 | 512 RANGE |
| 1 | 0 | 1 | 0 | 1 | 256 RANGE |
| 1 | 0 | 1 | 1 | 0 | 128 RANGE |
| 1 | 0 | 1 | 1 | 1 | VALID BIT MAP |

| FORMAT EXPRESSION | FREQ No | FREQ RANGE | REMARKS |
|---|---|---|---|
| ARRANGED BY 10 BITS | 12 | UNLIMITED | START FREQ UNLIMITED |
| BIT MAP #0 | 124 | 124 | START FREQ UNLIMITED |
| 1024 RANGE | 17 | UNLIMITED | START FREQ UNLIMITED |
| 512 RANGE | 18 | 512 | START FREQ UNLIMITED |
| 256 RANGE | 22 | 256 | START FREQ UNLIMITED |
| 128 RANGE | 29 | 128 | START FREQ UNLIMITED |
| VARIABLE BIT MAP | 112 | 112 | START FREQ UNLIMITED |

| | 8 | 7 | 6 | 5 | 4 | 3 | 2 | 1 | |
|---|---|---|---|---|---|---|---|---|---|
| | \multicolumn{8}{c|}{FREQ LIST IEI} | OCTET #1 |
| | \multicolumn{8}{c|}{LENGTH OF FREQ LIST CONTENTS} | OCTET #2 |
| | FORMAT ID #1 | SPARE | | | | FORMAT ID #2 | | | OCTET #3 |
| | \multicolumn{8}{c|}{ArfcnA} | OCTET #4 |
| | ArfcnA+1 | ArfcnA+2 | ArfcnA+3 | ArfcnA+4 | ArfcnA+5 | ArfcnA+6 | ArfcnA+7 | | OCTET #5 |
| | \multicolumn{8}{c|}{ArfcnB / ArfcnA+5} | OCTET #6 |
| | \multicolumn{8}{c|}{FREQ INFO} | OCTET #7 |
| | | | | | | | | | . . . |
| | | | | | | | ArfcnK+N | | OCTET #18 |

| FORMAT EXPRESSION | No OF BASIC FREQ | N |
|---|---|---|
| ORG_10 | 10 | 2 |
| ORG_9 | 9 | 3 |
| ORG_8 | 8 | 5 |
| ORG_7 | 7 | 7 |
| ORG_6 | 6 | 10 |
| ORG_5 | 5 | 14 |
| ORG_4 | 4 | 20 |
| ORG_3 | 3 | 30 |

FIG. 6

| FORMAT ID #1 | | FORMAT ID #2 | | | FORMAT EXPRESSION |
|---|---|---|---|---|---|
| BIT 8 | BIT 7 | BIT 4 | BIT 3 | BIT 2 | |
| 0 | 1 | 0 | 0 | 0 | ORG_10 |
| 0 | 1 | 0 | 0 | 1 | ORG_9 |
| 0 | 1 | 0 | 1 | 0 | ORG_8 |
| 0 | 1 | 0 | 1 | 1 | ORG_7 |
| 0 | 1 | 1 | 0 | 0 | ORG_6 |
| 0 | 1 | 1 | 0 | 1 | ORG_5 |
| 0 | 1 | 1 | 1 | 0 | ORG_4 |
| 0 | 1 | 1 | 1 | 1 | ORG_3 |

FIG. 7

| FORMAT EXPRESSSION | FREQ No | FREQ RANGE | REMARKS |
|---|---|---|---|
| ORG_10 | 30 | UNLIMITED | START FREQ UNLIMITED |
| ORG_9 | 36 | UNLIMITED | START FREQ UNLIMITED |
| ORG_8 | 48 | UNLIMITED | START FREQ UNLIMITED |
| ORG_7 | 56 | UNLIMITED | START FREQ UNLIMITED |
| ORG_6 | 66 | UNLIMITED | START FREQ UNLIMITED |
| ORG_5 | 75 | UNLIMITED | START FREQ UNLIMITED |
| ORG_4 | 84 | UNLIMITED | START FREQ UNLIMITED |
| ORG_3 | 93 | UNLIMITED | START FREQ UNLIMITED |

FIG. 8

FREQUENCY LIST IMPLEMENTED USING A PLURALITY OF BASIC FREQUENCIES AND BIT MAPS FOR USE IN A GSM SYSTEM

PRIORITY

This application claims priority to an application entitled "Frequency List Implemented Using a Plurality of Basic Frequencies and Bit Maps for Use in a GSM System" filed in the Korean Industrial Property Office on Dec. 31, 1999 and assigned Serial No. 99-68287, the contents of which are hereby incorporated by reference.

BACKGROUND OF THE INVENTION

1. Field of the Invention

The present invention relates generally to a frequency list provided to a mobile terminal by a GSM (Global System for Mobile telecommunication) system, and in particular, to a frequency list implemented using a plurality of basic frequencies and bit maps.

2. Description of the Related Art

Figure 1:
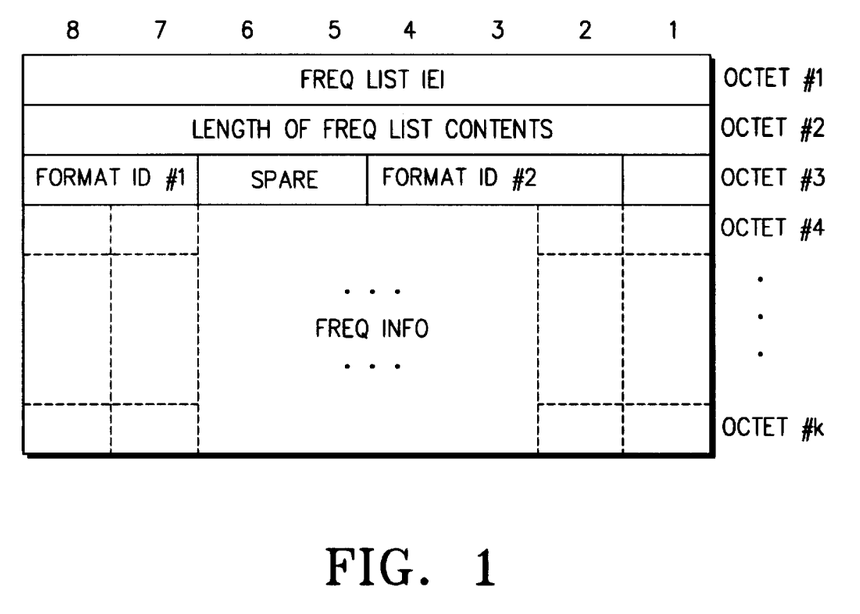
FIG. 1 is a diagram showing a structure of a conventional frequency information format.
Figure 2:
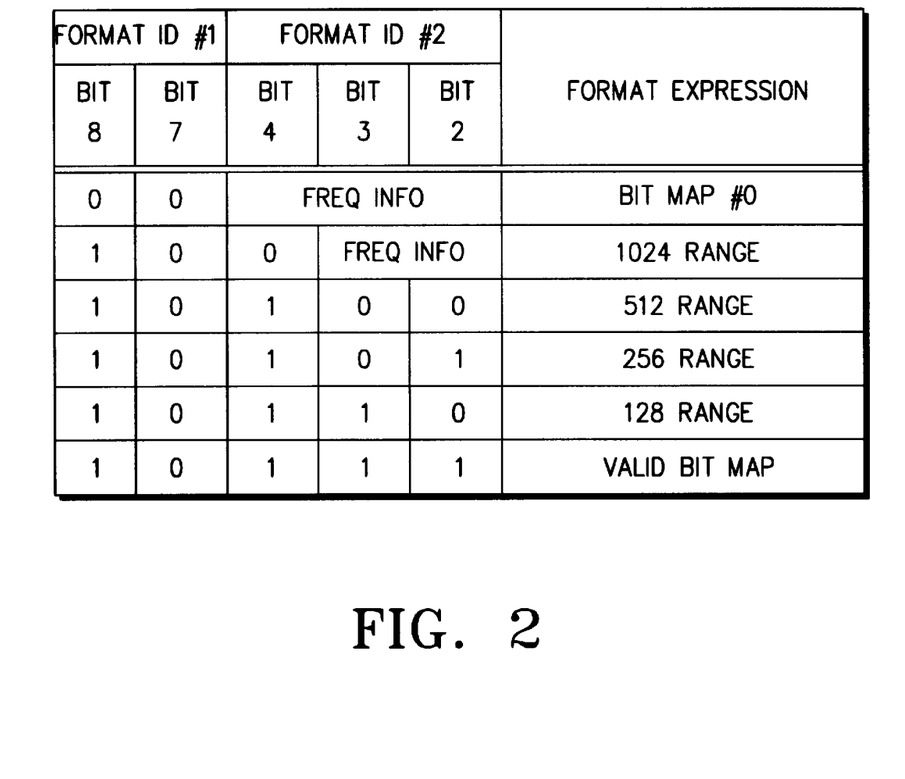
FIG. 2 is a table showing the types of the frequency information coding formats.

The GSM system provides a mobile terminal with frequency information about hopping and neighboring cells. In particular, FIG. 1 shows a conventional frequency information format. Under the GSM Standard No. 04.08 introduced by ETSI (European Telecommunications Standard Institute), the frequency information provided from the system has the format shown in FIG. 1. In addition, FIG. 2 is a table showing the types of conventional frequency information coding formats. As shown, frequency information is typically encoded and decoded in 6 types of formats. With regard to performance of the formats, the GSM Standard No. 04.08 J.3 specifies two particulars: the first is the number of available frequencies and the second is a range of the available frequencies. The GSM system uses 1024 frequencies, ranging from frequency number 0 to 1023. Further, the GSM system typically uses 16 octets for the frequency information. In FIG. 1, for k=18, 10 bits are needed to express the 1024 frequencies one by one. In this case, there are 12 frequencies which can be expressed in 16 octets. In this method, it is possible to express 12 of the 1024 frequencies without any restriction.

On the other hand, when the bit map 0 shown in FIG. 2 is used, it is possible to use 124 frequencies of frequency number 1 to 124, so that though the number of the available frequencies increases, the expression range is highly restricted between the frequency numbers 1 and 124.

The 1024, 512, 256 and 128 ranges shown in FIG. 2 can improve the frequency range as compared with the bit map 0 by using a dichotomy method, and express more frequencies than in the above-stated method. However, the number of the frequencies is much less restrictive as compared with the bit map 0 shown in FIG. 4.

Figure 3:
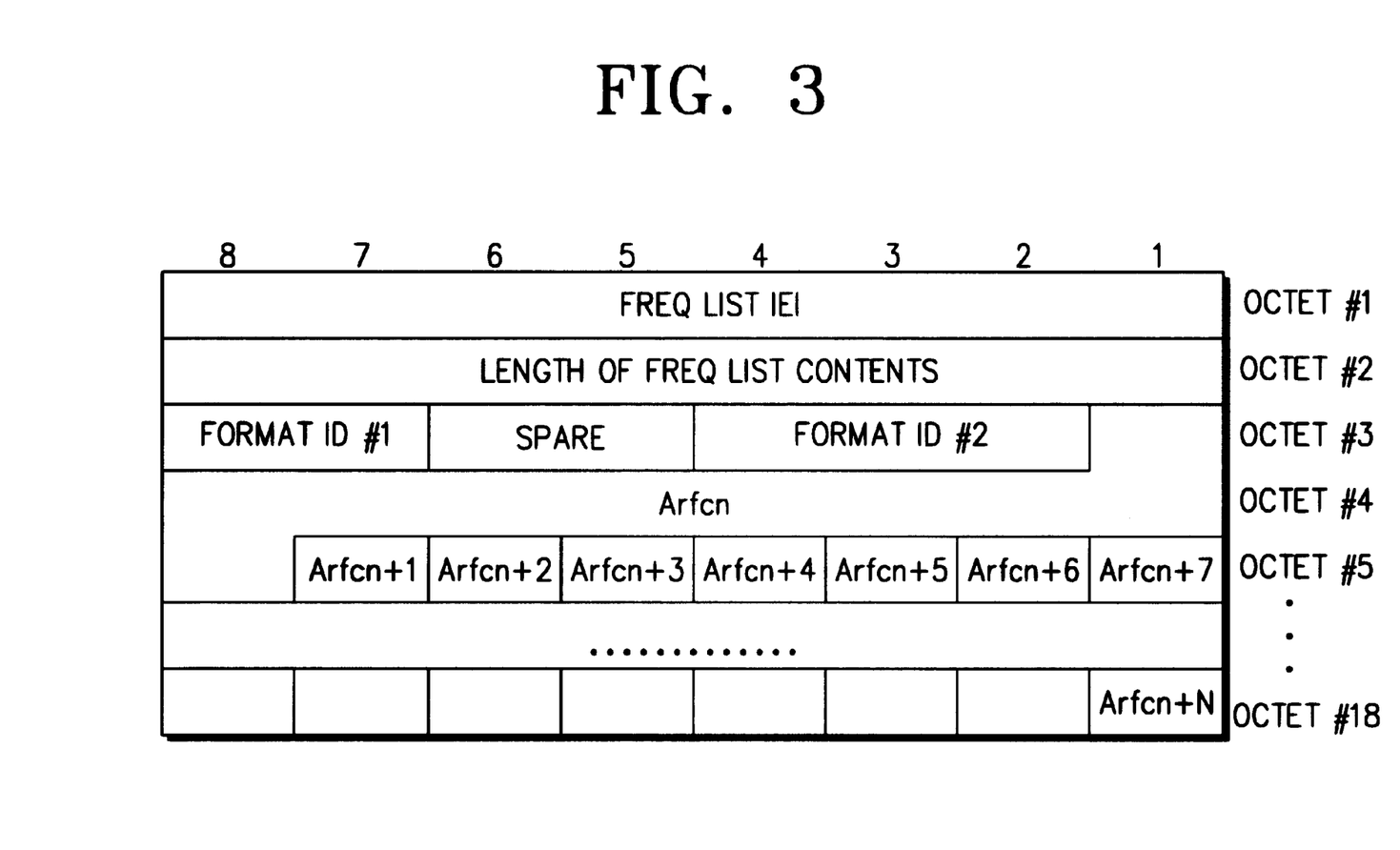
FIG. 3 is a diagram showing a format of a conventional variable bit map.

FIG. 3 shows a format of a variable bit map. The variable bit map, an improved bit map 0, is almost identical in terms of the number and range of the frequencies, but relaxes the restriction that the bit map 0 can express only the frequency number 1 to 124.

Figure 4:
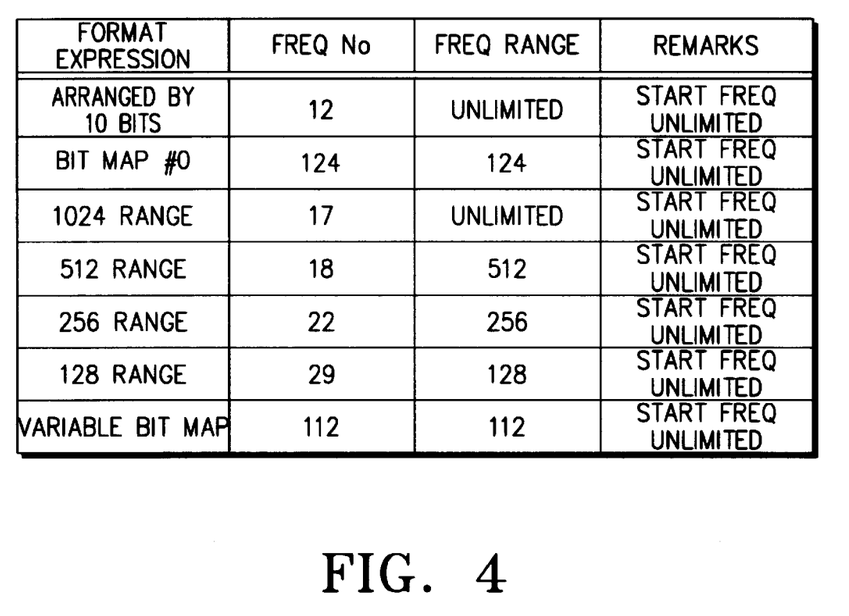
FIG. 4 is a table comparatively showing performances of the conventional frequency information formats.

FIG. 4 comparatively shows performances of the frequency information formats. Referring to FIG. 4, the frequency range is inversely proportional to the number of the frequencies. That is, an increase in number of the frequencies causes a decrease in frequency range, and an increase in frequency range causes a decrease in number of the frequencies. The bit map 0 and the variable bit map have a large number of the frequencies, but they have a restrictive range. On the other hand, the 1024, 512, 256 and 128 ranges have almost no restriction on the frequency ranges, but have a small number of the frequencies. If the number of the frequencies and the frequency range both increase, it will be advantageous in that the system can efficiently utilize the resources when providing system information to the mobile terminal. For example, if the frequencies are within the 1024 range when transmitting information on the 32 frequencies, the conventional method requires at least two formats as shown in FIG. 4. In FIG. 4, only the bit map 0 format and the variable bit map format express the 32 frequencies. As shown, the frequency number is 124 and 112, respectively. The 1024 range has a frequency number of 17. If the 32 frequencies within the 1024 range must be transmitted, the conventional method requires at least two formats as shown in FIG. 4. Each must be transmitted at the separate times, due to the characteristics of the GSM system. That is, two independent pieces of the information must be transmitted to the channel at the separate times.

SUMMARY OF THE INVENTION

It is, therefore, an object of the present invention to provide a method for implementing a frequency list for use in a GSM system such that it has an increased system resource efficiency.

To achieve the above and other objects, there is provided a frequency format for use in a GSM (Global System for Mobile telecommunication) system. The frequency format comprises first information for defining a frequency list, said first information being arranged in a first octet; second information for defining a length of the frequency list, said second information being arrange in a second octet; first and second format IDs (identifications) being arranged in a specific part of a third octet; a plurality of basic frequencies arranged in a remaining part of the third octet to the last octet; and a plurality of bit maps each arranged between the basic frequencies. The number of basic frequencies is varied depending on the length of the frequency list and the number of the bit maps between the basic frequencies.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Unlike the variable bit map which uses only one variable frequency, a preferred embodiment of the present invention uses a plurality of basic frequencies which are variable. The number of bit maps is restricted in order to use the basic frequencies.

Figure 5:
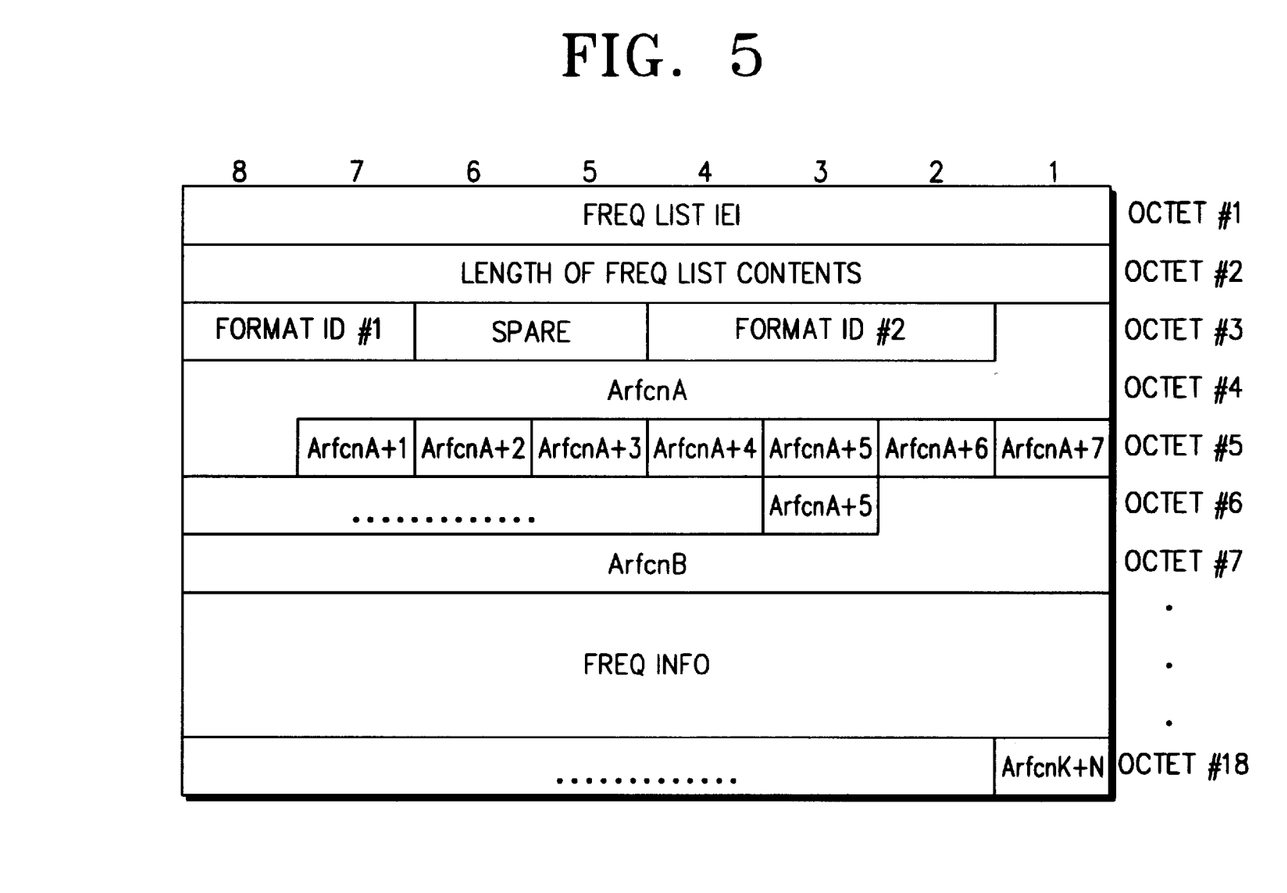
FIG. 5 is a diagram showing a frequency information format according to an embodiment of the present invention.

FIG. 5 shows a frequency information format according to an embodiment of the present invention. This frequency information format is differently expressed according to the parameters of the frequency information format defined in the table of FIG. 6. On the whole, the frequency information format includes a plurality of basic frequencies of ArfcnA and ArfcnB, and a plurality of bit maps each interposed between the basic frequencies. "Arfcn" refers to "absolute radio frequency channel number", whose frequencies are in the range of 0–1023, as set forth in the GSM Standard. The number of the basic frequencies depends on a length of the frequency list and the number of the bit maps between the basic frequencies. In the embodiment of the present invention, the length of the frequency list is assumed to be 16 octets.

One bit of an octet #3, eight bits of an octet #4 and one bit of an octet #5 constitute one basic frequency ArfcnA. Being comprised of 10 bits, the basic frequency ArfcnA can express any frequency. From the $7^{th}$ bit of the octet #5 to the $3^{rd}$ bit of an octet #6, there are arranged n bit maps and each bit indicates a frequency which is N-bit away from the basic frequency ArfcnA. That is, a frequency which is 1-bit away is indicated by 'ArfcnA+1', a frequency which is 2-bit away is indicated by 'ArfcnA+2', and a frequency which is N-bit away is indicated by 'ArfcnA+N', respectively. A bit map #N is followed by 10 bits again, which indicate the second basic frequency ArfcnB. As in the ArfcnA, the ArfcnB is also followed by N bit maps, and each bit indicates a frequency which is N-bit away from the basic frequency. An exact expression of 'ArfcnA+1' is given as '(ArfcnA+1) mod 1024' in order to make a smooth connection from the frequency number 1023 to the frequency number 0.

Figure 6:
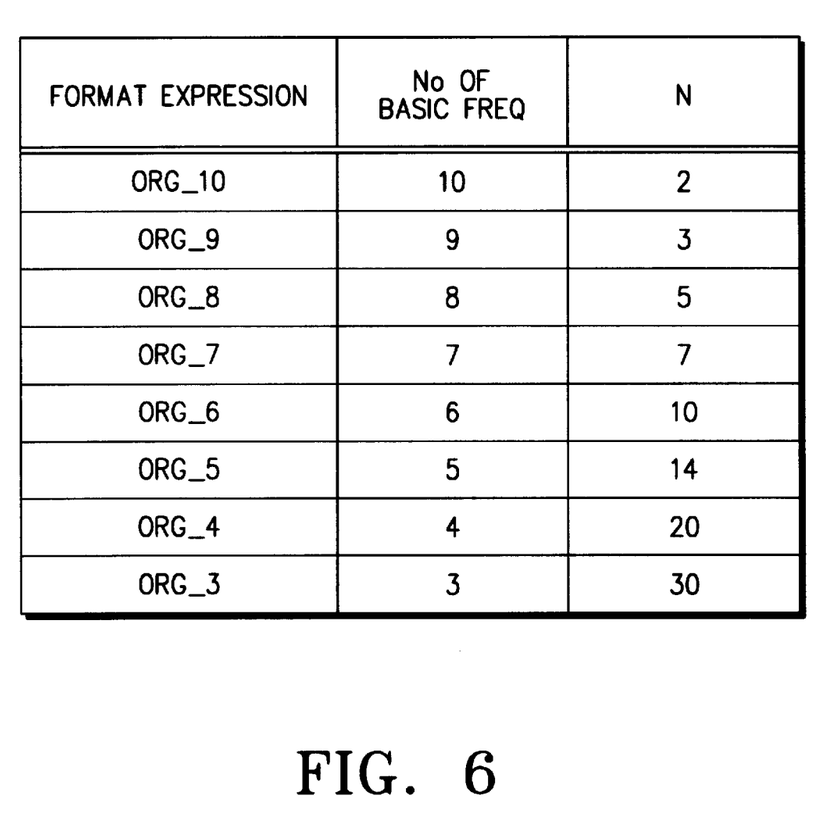
FIG. 6 is a table defining parameters of the frequency information formats according to an embodiment of the present invention.

FIG. 6 is a table defining the parameters of the frequency information format according to an embodiment of the present invention. When the length of the frequency list is 16 octets, an optimized parameter value N is given in order to obtain the maximum number and range of the frequencies. When N=2, the maximum number of the basic frequencies which can be included in the 16 octets is 10. When N=3, a maximum of 9 basic frequencies are available. When N=30, a maximum of 3 basic frequencies are available.

Figure 7:
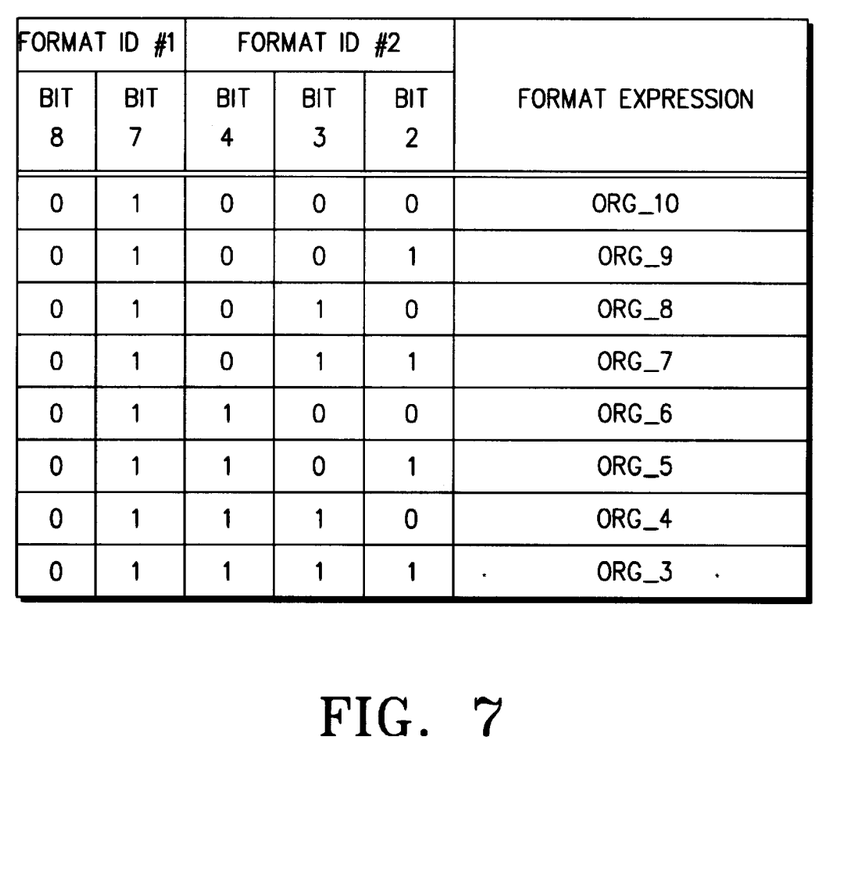
FIG. 7 is a table showing the types of the frequency information formats according to an embodiment of the present invention.

FIG. 7 is a table showing the types of the frequency information formats of FIG. 5. The formats are, as shown, defined according to the N value. In FIG. 7, the values to be used for the format ID #1 and the format ID #2 are defined according to format expression. A format ID presently defined in the GSM Standard No. 04.08 is shown in FIG. 2. In order to maintain a compatibility with the conventional format ID, the format IDs of FIG. 7 should be so set as not to overlap with those of FIG. 2. The specific numerical values for the format IDs of FIG. 7 are given by way of example, and must maintain the compatibility with the existing format ID. The bit values 0 and 1 are equally defined by the GSM Standard No. 04.08, as in the prior art method.

Figure 8:
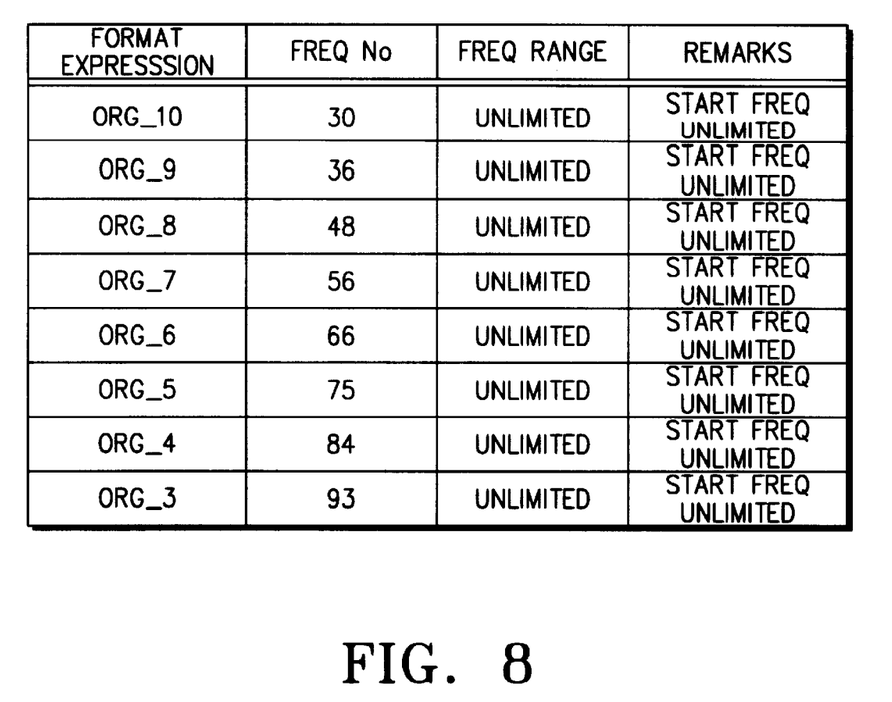
FIG. 8 is a table comparatively showing performances of the frequency information formats according to an embodiment of the present invention.

FIG. 8 is a table for comparatively showing performances of the frequency information formats according to an embodiment of the present invention. As shown, when at least one group of frequencies is located quite a distance from other groups, for example, as between one frequency group of "1, 2, 3, 4, 5" and another group of "520, 521, 522", it is possible to fill many frequencies into one frequency format according to the present invention. Accordingly, it is possible to efficiently utilize the resources when providing the system information to the mobile terminal.

As described above, the mobile phone according to the present invention can express the frequency list using a plurality of basic frequencies and bit maps, thus increasing an efficiency of the system resources.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A frequency format for use in a Global System for Mobile telecommunication (GSM) system, said frequency format, comprising:

first information for defining a frequency list, said first information being arranged in a first octet;

second information for defining a length of the frequency list, said second information being arranged in a second octet;

first and second format identifications (IDs) being arranged in a specific part of a third octet;

a plurality of basic variable frequencies arranged in a remaining part of the third octet to a $P^{th}$ octet; and a plurality of bit maps each arranged between the basic frequencies.

2. The frequency format as claimed in claim 1, wherein P equals 16 and each said octet is comprised of 8 bits.

3. The frequency format as claimed in claim 2, wherein the number of the basic frequencies is varied depending on the length of the frequency list and the number of the bit maps between the basic frequencies.

4. A method of using a frequency format in a Global System for Mobile telecommunication (GSM), said method comprising steps of:

defining a frequency list according to first information arranged in a first octet;

defining a length of the frequency list according to second information arranged in a second octet;

arranging a first and second format identification in a specific part of a third octet;

arranging a plurality of basic frequencies in a remaining part of the third octet and in octets 4 through octet P; and arranging a plurality of bit maps between said plurality of basic frequencies, wherein a number of said plurality of basic frequencies is varied depending on a length of said frequency list and a number of said bit maps.

5. The method of claim 4, wherein P equals 16 and each said octet is comprised of 8 bits.

* * * * *